(12) United States Patent
Chu

(10) Patent No.: US 6,828,355 B1
(45) Date of Patent: Dec. 7, 2004

(54) RESIN-REINFORCED UV, MOISTURE AND UV/MOISTURE DUAL CURABLE SILICONE COMPOSITIONS

(75) Inventor: Hsien-Kun Chu, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 54 days.

(21) Appl. No.: 10/031,361

(22) PCT Filed: Jul. 7, 2000

(86) PCT No.: PCT/US00/16312

§ 371 (c)(1),
(2), (4) Date: Jan. 18, 2002

(87) PCT Pub. No.: WO01/05846

PCT Pub. Date: Jan. 25, 2001

Related U.S. Application Data

(60) Provisional application No. 60/144,257, filed on Jul. 19, 1999.

(51) Int. Cl.[7] .............................. C08F 2/48; C08L 67/00; C08L 75/06; C08G 63/00
(52) U.S. Cl. ..................... 522/99; 522/148; 522/172; 522/60; 522/24; 522/66; 522/71; 522/81; 525/280; 525/281; 525/282; 525/410; 525/411; 525/437; 525/445
(58) Field of Search .................... 522/60, 24, 66, 522/71, 81, 104, 105, 99, 172, 148; 525/280, 281, 282, 410, 411, 437, 445

(56) References Cited

U.S. PATENT DOCUMENTS

| | | | |
|---|---|---|---|
| 3,933,712 A | 1/1976 | Vanaglash, Jr. | 260/29.1 SB |
| 4,072,635 A | 2/1978 | Jeram | 260/2.5 S |
| 4,087,585 A | 5/1978 | Schulz | 428/429 |
| 4,201,808 A | 5/1980 | Cully et al. | 428/40 |
| 4,271,425 A | 6/1981 | Wong | 357/72 |
| 4,348,454 A | 9/1982 | Eckberg | 428/334 |
| 4,374,967 A | 2/1983 | Brown et al. | 528/15 |
| 4,513,115 A | 4/1985 | Beers | 524/731 |
| 4,528,081 A | 7/1985 | Lien et al. | 204/159.13 |
| 4,528,353 A | 7/1985 | Lucas et al. | 528/34 |
| 4,539,367 A | 9/1985 | Beers | 524/731 |
| 4,675,346 A | 6/1987 | Lin et al. | 522/39 |
| 5,162,460 A | 11/1992 | Popa et al. | 525/478 |
| 5,179,134 A | 1/1993 | Chu et al. | 522/37 |
| 5,212,211 A | 5/1993 | Welch, II et al. | 522/37 |
| 5,300,608 A | 4/1994 | Chu et al. | 528/14 |
| 5,340,887 A | 8/1994 | Vincent et al. | 525/477 |
| 5,384,340 A | 1/1995 | Hara et al. | 522/99 |
| 5,486,565 A | 1/1996 | Gentle et al. | 524/730 |
| 5,489,622 A | 2/1996 | Hara et al. | 522/99 |
| 5,498,642 A | 3/1996 | Chu et al. | 522/99 |
| 5,508,360 A | 4/1996 | Cifuentes et al. | 525/477 |
| 5,516,812 A | 5/1996 | Chu et al. | 522/20 |
| 5,561,203 A | 10/1996 | Strong et al. | 525/477 |
| 5,605,999 A | 2/1997 | Chu et al. | 528/24 |
| 5,635,546 A | 6/1997 | Rich et al. | 523/176 |
| 5,696,209 A | 12/1997 | King et al. | 525/478 |
| 5,905,123 A | 5/1999 | Cifuentes | 525/477 |
| 5,952,397 A | 9/1999 | Fujiki et al. | 522/99 |

FOREIGN PATENT DOCUMENTS

| | | | | |
|---|---|---|---|---|
| EP | 0 767216 A1 | 4/1997 | ........... | C08L/83/04 |
| GB | 2 039 287 A | 6/1980 | ........... | C08G/77/04 |

Primary Examiner—James J. Seidleck
Assistant Examiner—Sanza McClendon
(74) Attorney, Agent, or Firm—Steven C. Bauman

(57) ABSTRACT

This invention relates to resin-reinforced silicone compositions curable upon exposure to radiation in the electromagnetic spectrum, which compositions when cured demonstrate improved elastomeric properties, such as tensile strength, modulus and elongation. The inventive resin-reinforced silicone compositions may alternatively be rendered curable by exposure to moisture. In addition, the inventive composition may be rendered curable by exposure to radiation in the electromagnetic spectrum, and exposure to moisture. The inventive silicone compositions are particularly well suited for use in electronic conformal coating and potting applications, as well as in automotive gasketing applications, pressure sensitive adhesive applications and the like.

25 Claims, No Drawings

RESIN-REINFORCED UV, MOISTURE AND UV/MOISTURE DUAL CURABLE SILICONE COMPOSITIONS

This applications claims the benefit of provisional application No. 60/144,257, filed Jul. 19, 1999.

BACKGROUND OF THE INVENTION

1. Field of the Invention

This invention relates to resin-reinforced silicone compositions curable upon exposure to radiation in the electromagnetic spectrum, which compositions when cured demonstrate improved elastomeric properties, such as tensile strength, modulus and elongation. The inventive resin-reinforced silicone compositions may alternatively be rendered curable by exposure to moisture. In addition, the inventive composition may be rendered curable by exposure to radiation in the electromagnetic spectrum, and exposure to moisture. The inventive silicone compositions are particularly well suited for use in electronic conformal coating and potting applications, as well as in automotive gasketing applications, pressure sensitive adhesive applications and the like.

2. Brief Description of Related Technology

Silicone elastomers have been used for potting and encapsulating electrical devices, such as integrated circuits, because of their excellent thermal stability, low temperature flexibility and high dielectric strength. They typically provide shock, vibrational and thermal stress protection on fragile electronic components. [See U.S. Pat. Nos. 3,933,712; 4,072,635; 4,087,585; 4,271,425; 4,374,967; and D. Dickson, Jr., *Proc. Electric/Electronic Intel. Conf.*, 12, 92 (1975). See also U.S. Pat. No. 4,374,967.]

Certain silicones containing (meth)acrylate functional groups may be cured by ultraviolet light ("UV light"). See U.S. Pat. Nos. 4,201,808 and 4,348,454, and U.K. Patent Application GB 2039287A, which, though not producing elastomeric materials, describe UV light curing compositions of silicones containing (meth)acrylates for paper release coatings.

Room temperature vulcanization ("RTV") (also called moisture curable) silicone compositions are well known, such as those sold under the ULTRA tradename.

Loctite Corporation has for a number of years sold under the "NUVASIL" tradename a variety of UV and UV/moisture curable silicone compositions—that is, silicone compositions curable upon exposure to UV light or UV light, followed by exposure to moisture. These compositions generally provide a reactive polyorganosiloxane component, and a photoinitiator component. Where moisture cure capabilities are also desirable, a moisture cure catalyst is also included. The viscosity of the composition, as well as the physical properties of the cured elastomer, may be modified by the inclusion of a non-reactive silicone fluid, such as a polydimethyl siloxane, for instance one terminated with alkyl silyl groups (e.g., trimethyl silyl, hydroxyl dimethyl silyl, alkoxy dimethyl silyl and the like). See U.S. Pat. No. 4,528,081 (Lien), the disclosure of which is hereby expressly incorporated herein by reference. See also U.S. Pat. No. 5,179,134 (Chu) and U.S. Pat. No. 5,300,608 (Chu), the disclosure of each of which is hereby expressly incorporated herein by reference.

Other UV and UV/moisture curable silicone compositions are also known. [See U.S. Pat. No. 5,489,622 (Hara) and U.S. Pat. No. 5,384,340 (Hara).]

Silicone elastomers, however, are inherently very weak materials due to weak intermolecular van der Waals forces between the siloxane chains. In the past, improved strength has been imparted to certain of these compositions by including a fumed silica as a reinforcing filler. See U.S. Pat. No. 4,675,346 (Nakos), the disclosure of which is expressly hereby incorporated herein by reference. One drawback to this approach in some instances is that dispensability may become difficult, as oftentimes even a small amount of fumed silica tends to increase viscosity.

In addition, inclusion of such reinforcing filler tends to confer a translucent or "milky" appearance to the silicone compositions. Such an appearance can be disadvantageous in many applications, particularly where cure is to occur through exposure to radiation in the electromagnetic spectrum and/or where clarity of the cured elastomer is a desirable property. Radiation cure may become impeded when the composition has a translucent appearance because the radiation pathway through the composition may become blocked.

Recently, Loctite Corporation made an advance in the field of anaerobically-curable silicone compositions by providing compositions including (a) a silicone fluid formed as the reaction product of a first silane having at least one hydrolyzable functional group, and a second silane having a (meth)acrylic functional group and at least one hydrolyzable meth)acrylic functional group and at least one hydrolyzable functional group. (b) a (meth)acrylate monomer; and (c) polymerization initiator. See U.S. Pat. No. 5,605,999 (Chu) and U.S. Pat. No. 5,635,546 (Rich), the disclosures of each of which are hereby expressly incorporated herein by reference.

Silicone products of the type noted above (sometimes referred to as "MQ" resins) have been used to impart reinforcement properties to cured elastomers of heat-curable silicone compositions without increasing the viscosity of the composition, and while maintaining the clarity of the composition.

MQ resins generally are copolymers of siloxanes formed from reactive trialkylsilyl ("M") and tetra functional silicate ("Q") structures that can be prepared by either cohydrolyzing silanes containing M and Q units or by silylating inorganic silicates with a trialkylsilyl containing silanes.

Vinyl- or hydride-containing silanes have been added during preparation to yield MQ resins suitable for use in heat-cure silicone compositions. During heat cure, the vinyl groups on the MQ resin and the silicone fluid polymerize in a crosslinked network with the MQ resin incorporated in the network for reinforcement.

MQ resins have been used to impart reinforcement properties to room temperature vulcanization ("RTV") silicone compositions, as well. See U.S. Pat. No. 5,340,887 and European Patent Document EP 767 216. Here, the use of a resin-polymer system is described where both resin and polymer contain hydroxl groups and may be crosslinked with the addition of an oxime crosslinker.

One drawback to the use of MQ resins to reinforce reaction products of silicone-based compositions is their compatibility with the remaining components of the composition—that is, phase separation is oftentimes seen to occur. This results in a compromised shelf life stabiliity for certain one-part silicone-based compositions.

Notwithstanding the state-of-the-technology, it would be desirable to provide resin-reinforced radiation and radiation/moisture curable silicone compositions. Such compositions could advantageously be used in a variety of commercial applications and would benefit from the enhanced strength imparted by the resin reinforcement.

SUMMARY OF THE INVENTION

The present invention meets the desires discussed above by providing resin-reinforced silicone compositions capable of curing upon exposure to radiation in the electromagnetic spectrum, such as UV light, and exposure to moisture, such as is found under atmospheric conditions, and a combination thereof:

The compositions include:

(a) a polyorganosiloxane, having photocurable groups, such as (meth)acrylate or glycidoxyl functionality, like methacryloxypropyl, vinyl ether groups and the like and/or moisture curable groups, such as alkoxy or aryloxy groups, like methoxy, acetoxy groups, oximino groups, enyloxy groups, imido groups, amino groups, and the like;

(b) a silicone resin selected from
  (i) those formed from at least one silane within the formula $R^1_m R^2_p Si(X)_{4-(m+p)}$ I, where $R^1$ is a (meth) acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ alkylaryl, or a hydrolyzable group, X is a hydrolyzable group, m is an integer from 1 to 3, and m+p is an integer from 1 to 3;
  (ii) those formed from at least one silane within the formula $R^3_q Si(X)_{4-q}$ II, where $R^3$ may be the same as or different from $R^2$ above and may be selected from monovalent ethylenically unsaturated radicals, hydrogen, $C_{1-12}$ alkyl, $C_{6-12}$ aryl, and $C_{7-19}$ alkylaryl, and q is an integer from 1 to 3, reacted with at least another silane within the formula of $R^4_r R^5_s Si(X)_{4-(r+s)}$ III, where $R^4$ and $R^5$ may be the same or different and may be selected from monovalent ethylenically unsaturated radicals, hydrogen, $C_{1-12}$ alkyl, $C_{6-12}$ aryl, $C_{7-18}$ alkylaryl, r is an integer from 1 to 3, and r+s is an integer from 1 to 3, provided the silicone resin formed contains at least some hydrolyzable group, X; and combinations thereof; and (c) a photoinitiator, moisture cure catalyst, and combinations thereof.

In a particularly desirable aspect of the invention, the compositions include:

(a) a polyorganosiloxane, having photocurable groups, such as (meth)acrylate functionality, like methacryloxypropyl, and/or moisture curable groups, such as alkoxy or aryloxy groups, like methoxy;

(b) a silicone resin formed as the reaction product of:
  (i) at least one silane within the formula $R^1_m R^2_p Si(X)_{4-(m+p)}$ I, where $R^1$ is a (meth)acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, or a hydrolyzable group, X is a hydrolyzable group, m is an integer from 1 to 3, and m+p is an integer from 1 to 3, and
  (ii) at least one other silane within the formula $R_n Si(X)_{4-n}$ IV, where R may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer of from 0 to 3; and (c) a photoinitiator, a moisture curing catalyst, and combinations thereof.

The invention further provides a process for preparing reaction products from the compositions of the present invention, the steps of which include applying the composition to a desired substrate surface, particularly one having shadow areas not readily accessible to light, and irradiating the coated substrate surface to conditions which are appropriate to effect cure thereof—e.g., exposure to radiation in electromagnetic spectrum. Optionally, the composition may then be exposed to moisture to further cure the composition.

Also, the invention of course provides the reaction products so-formed by the above-described process, which reaction products demonstrate improved physical properties, such as tensile strength, modulus and elongation.

The present invention will be more fully appreciated by a reading of the detailed description and the illustrative examples which follow thereafter.

DETAILED DESCRIPTION OF THE INVENTION

As noted above, the compositions include:

(a) a polyorganosiloxane, having photocurable groups, such as (meth)acrylate functionality, like methacryloxypropyl, and/or moisture curable groups, such as alkoxy or aryloxy groups, like methoxy;

(b) a silicone resin selected from
  (i) those formed from at least one silane within the formula $R^1_m R^2_p Si(X)_{4-(m+p)}$ I, where $R^1$ is a (meth) acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ alkylaryl, or a hydrolyzable group, X is a hydrolyzable group, m is an integer from 1 to 3, and m+p is an integer from 1 to 3;
  (ii) those formed from at least one silane within the formula $R^3_q Si(X)_{4-q}$ II, where $R^3$ may be the same as or different from $R^2$ above and may be selected from monovalent ethylenically unsaturated radicals, hydrogen, $C_{1-12}$ alkyl, $C_{6-12}$ aryl, $C_{7-18}$ alkylaryl, and q is an integer from 1 to 3, reacted with at least another silane within the formula of $R^4_r R^5_s Si(X)_{4-(r+s)}$ III, where $R^4$ and $R^5$ may be the same or different and may be selected from monovalent ethylenically unsaturated radicals, hydrogen, $C_{1-12}$ alkyl, $C_{6-12}$ aryl, $C_{7-18}$ alkylaryl, r is an integer from 1 to 3, and r+s is an integer from 1 to 3, provided the silicone resin form contains at least some hydrolyzable group, X; and combinations thereof; and (c) a photoinitiator, a moisture catalyst, and combinations thereof.

In a particularly desirable aspect of the invention, the compositions include:

(a) a polyorganosiloxane, having photocurable groups, such as (meth)acrylate functionality, like methacryloxypropyl, and/or moisture curable groups, such as alkoxy or aryloxy groups, like methoxy;

(b) a silicone resin formed as the reaction product of:
  (i) at least one silane within the formula $R^1_m R^2_p Si(X)_{4-(m+p)}$ I, where $R^1$ is a (meth)acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, or a hydrolyzable group, X is a hydrolyzable group, m is an integer from 1 to 3, and m+p is an integer from 1 to 3, and (ii) at least one other silane within the formula $R_nSi(X)_{4-n}$ IV, where R may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer of from 0 to 3; and (c) a photoinitiator, a moisture curing catalyst, and combinations thereof.

The inventive compositions may be used as adhesives, coatings, sealants, as well as molding compounds, in applications ranging for instance from preapplied gasketing applications, to virtually any existing RTV silicone application that can accommodate a UV light cure step.

The inventive compositions are capable of being rapidly cured by exposure to UV light, and if desired exposure to atmospheric moisture. Cure typically occurs through exposure to light with a UV intensity of 70,000 mW/cm². The cured compositions are tough elastomeric materials that display typical silicone elastomer properties including wide usable temperature range, and good water resistance.

The polyorganosiloxane should have an average linear molecular size of at least about 50 siloxane units, with (meth)acrylate, (meth)acryloxyalkyldialkoxysilyl and/or (meth)acryloxyalkyldiaryloxysilyl groups on the polyorganosiloxane, such as at the terminal ends. Desirably, the (meth)acryloxyalkyldialkoxysilyl group should be a (meth)acryloxypropyldimethoxysilyl group.

For instance, the polyorganosiloxane may be selected from compounds within formula V below:

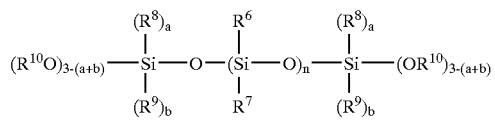

where $R^6$, $R^7$, $R^8$ and $R^9$ may be the same or different and are alkyl, alkenyl, aryl, (meth)acryl, and the like, provided that at least one of $R^6$, $R^7$, $R^8$ and $R^9$ is (meth)acryl, having up to carbon atoms ($C_{1-10}$), or substituted versions thereof, such as halo- or cyano-substituted; $R^{10}$ is alkyl having up to 10 carbon atoms ($C_{1-10}$); n is an integer between about 100 and 1,200; a is 1 or 2; b is 0, 1 or 2; and a+b is 1, 2 or 3.

It is particularly desirable to hare polyorganosiloxanes, where $R^6$ and $R^7$ are methyl, $R^8$ is (meth)acrylate; $R^9$ and $R^{10}$ is alkyl, such as methyl, and n is an integer between about 100 and 1,200, inclusive.

Generally, it is convenient to use a linear polyorganosiloxane having (meth)acrylate groups terminating the silicone. Such (meth)acrylate-terminated silicones may be represented by the formula VI below:

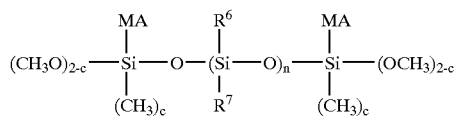

where $R^6$ and $R^7$ are as defined above, MA is (meth)acrylate and c is 0, 1 or 2.

Generally, the silicone resins are a family of silicone-based materials with a structure represented generally by $(R_3SiO_{1/2})_w(R_2SiO_{2/2})_x(RSiO_{3/2})_y(SiO_{4/2})_z$, where a portion of the total R content includes (meth)acrylate functionality. Desirably, and in the aspect of the invention where at least two silanes form a reaction product, the total (meth)acrylate containing silicon functionality on the silicone resin may be up to about 15 mole % of the silicone resin, such as in the range of about 1 mole % to about 10 mole %, for instance about 4 mole % to about 8 mole %.

Silicone resins may be formed from at least one silane within the formula $R^1_mR^2_pSi(X)_{4-(m+p)}$ I, where $R^1$ is a (meth)acrylate functional group or a hydrolyzable group, and $R^2$ may be the same or different and may be selected from monovalent ethylenically unsaturated radicals, hydrogen, $C_{1-12}$ alkyl, $C_{6-12}$ aryl, $C_{7-18}$ arylalkyl, $C_{7-18}$ alkylaryl, or a hydrolyzable group, X is a hydrolyzable functionality, m is an integer of from 1 to 3 and m+p is an integer from 1 to 3, or as reaction products of that at least one silane and at least one second silane within the formula $R_nSi(X)_{4-n}$ II, where R may be the same or different and may be selected from monovalent ethylenically unsaturated radicals, hydrogen, $C_{1-2}$ alkyl, $C_{6-12}$ m aryl, $C_{7-18}$ arylalkyl, $C_{7-18}$ alkylaryl, haloalkyl, and haloaryl, X is a hydrolyzable functionality, and n is an integer of from 0 to 3. Certain of these moieties ordinarily may be reaction products of halogenated trialkylsilanes, tetraalkoxysilanes and (meth)acrylate substituted trialkoxysilanes.

The silicone resins may be formed through hydrolysis and condensation reactions.

These silicone resins may also be prepared by (1) acidifying water-soluble sodium silicate, and thereafter capping the resulting sol with a trialkylsilyl group as well as with (meth)acrylate-containing silane or (2) co-hydrolyzing and/or co-condensing silanes containing trialkylsilane groups, vinyl silane groups and tetraalkoxysilane. For a further discussion of silicone resins generally, see R. H. Blaney et al., "Silsesquioxanes", *Chem. Rev.*, 95, 1409–30 (1995).

In the reaction forming such silicone resins, a first silane should be used in an amount within the range of from about 1 to about 10 mole %, such as from about 4 to about 8 mole % of the combination of the first and second silanes. The other silane(s) should be used in an amount with the range of from about 90 to about 99 mole %, such as from about 92 to about 96 mole % of the combination of the first and the other silanes.

In the compositions of the present invention, the hydrolyzable functionality in the silanes may be any functionality which, when attached to a silicon atom through a Si—O, Si—halo, Si—N or Si—S bond, is readily hydrolyzable in the presence of water. Examples of such functionality include, but are not limited to, halogen (meth)acryloxy, alkoxy, aryloxy, isocyanato, amino, acetoxy, oximinoxy, aminoxy, amidato and alkenyloxy.

In the compositions of the present invention, R may be chosen from $C_{1-12}$ alkyl, $C_{6-12}$ aryl, alkenyl, (meth)acryloxyalkyl and vinyl. In such instances, when R is $C_{1-12}$ alkyl or $C_{6-12}$ aryl, examples of the first silane include, but are not limited to, (meth)acryloxypropyl trimethoxysilane, (meth)acryloxypropyl trichlorosilane, (meth)acryloxypropyl dimethylchloro silane, (meth)acryloxymethyl dichlorosilane and (meth)acryloxymethyldimethyl acryloxysilane.

When $R^1$ on the other silane is chosen from $C_{1-12}$ alkyl, $C_{6-12}$ aryl, the other silane itself may be dimethylchlorosilane, phenyltrichlorosilane, tetrachlorosilane, trimethylchlorosilane, trimethylmethoxysilane, dimethyldimethoxysilane, phenyltrimethoxysilane and tetraethoxysilane.

Of course, appropriate combinations of the first silane may be used as the first silane component; likewise appropriate combinations of the other silane(s) may be used as the other silane component.

The photoinitiator may include any one of those known in the art to initiate the curing of (meth)acrylate functional groups. These photoinitiators include benzoin and substituted benzoins, benzophenone, Michler's ketone, dialkoxyacetophenones, such as diethoxyacetophenone, and the like. Generally, the amount of photoinitiator chosen should be within the range of from 0.1 to about 5% by weight.

In those compositions in which moisture cure capabilities are also present, a moisture cure catalyst should also be included in an amount effective to cure the composition. For example, from about 0.1 to about 5% by weight, such as about 0.25 to about 2.5% by weight, of the moisture cure catalyst is desirable. Examples of such catalysts include organic titanium, tin, and zirconium complexes and of course combinations thereof. Tetraisopropoxytitanium and tetrabutoxytitanium are particularly desirable. See also U.S. Pat. No. 4,111,890, the disclosure of which is expressly incorporated herein by reference.

The compositions may also include a diluent component reactive at elevated temperature conditions.

Reactive diluents include those materials which are particularly (1) unreactive at ambient temperature conditions and (2) reactive at elevated temperature conditions. In addition, such diluents should be capable of not only reacting with other components of the inventive adhesive compositions, but also with reactive moities on itself. This feature allows the diluent to self-polymerize as well as polymerize with reactive moities on the other components of the composition. As such, the reactive diluent becomes incorporated into the polymeric matrix which forms at ambient temperature and which further forms at increased temperatures. The incorporation of the reactive diluent provides at least in part for the high temperature performance demonstrated by the cured composition.

More specific examples of such reactive diluents include alkenyl- or alkynyl-terminated silicone fluids, an example of which is vinyl-terminated polydimethylsiloxane.

Other examples of reactive diluents based on silicone fluids include alkenyl- or alkynyl-terminated silicone resins.

And of course appropriate combinations of such reactive diluents may be used.

When used, the reactive diluent should be employed in an amount within the range of about 1 to about 50% by weight, based on the total weight of the composition.

The compositions of the invention may also include other constituents to modify the physical properties of the composition or reaction products thereof, as desired depending on the specific application for which a composition within the scope of this invention is destined for use. For instance, adhesion promoters, such as (meth)acryloxypropyltrimethoxysilane, trialkylisocyanurate, and the like, may be included in an amount of up to about 5% by weight. Conventional silicone fillers, such as fumed and precipitated silica [see e.g. U.S. Pat. No. 4,675,346 (Nakos)], iron oxide, barium zirconate and calcium carbonate, may also be included in the inventive compositions. Still other conventional additives may also be included in the inventive compositions, such as non-(meth)acrylate functionalized silicone diluents (including silicone fluids having viscosities of between about 100 and 1,500 cps, which may or may not be terminated with hydrogen, alkyl, alkenyl, alkoxy or hydroxyl functionality, such as trimethylsilyl groups) and plasticizers, each of which may be present in an amount of up to about 30% by weight.

The plasticizers may be chosen from a wide variety of plasticizers depending on the desired properties of the composition and/or reaction product thereof. See e.g., U.S. Pat. No. 3,794,610 (Bachmann), the disclosure of which is hereby expressly incorporated herein by reference.

The compositions of the present invention may be prepared using conventional methods that are well known to those persons of skill in the art. For instance, the components of the inventive compositions may be mixed together in any convenient order consistent with the roles and functions the components are to perform in the compositions. Conventional mixing techniques using known apparatus may be employed.

The invention also provides a process for preparing reaction products from the compositions of the present invention, the steps of which include applying the composition to a desired substrate surface and exposing the coated substrate surface to conditions which are appropriate to effect cure thereof—e.g., exposure to radiation in the electromagnetic spectrum.

Also, the invention of course provides reaction products so-formed by the above-described process, which reaction products demonstrate improved physical properties, such as tensile strength, modulus and elongation.

In view of the above description of the present invention, it is clear that a wide range of practical opportunities is provided.

The following examples are illustrative of the invention, but in no way are intended to limit its scope.

EXAMPLES

1. General Synthesis of (Meth)acrylate Functional Trimethylsilylated Silicates

A. Tetraethoxysilane Method (Meth)acrylate-functional trimethylsilylated silicate [(meth)acrylate-functional MQ] may be prepared by the co-hydrolysis, co-condensation of trimethylchlorosilane, methacryloxypropyltrimethoxysilane and tetraethoxysilane. As described here, for a MQ resin with an M/Q ratio of about 0.9 and a (meth)acrylate content of about 8 mole % may be prepared. Of course, variations of the M/Q ratio and (meth)acrylate content may be achieved through routine variations in the amount of starting material.

In a one-liter, three-neck round bottom flask equipped with a reflux condenser, a mechanical stirrer and an addition funnel was charged with tetraethoxysilane (251.68 g; 1.21 mole), methacryloxypropyltrimethoxysilane (49.60 g; 0.20 mole), trimethylchlorosilane (118.27 g; 1.09 mole) and toluene (150 g). De-ionized water (125 g) was then slowly added to the mixture with stirring through the additional funnel during a period of time of about 15 minutes. The mixture was further heated at reflux for an additional period of time of about three hours, after which the mixture was allowed to cool to room temperature and phase separated in a separatory funnel. The lower layer of the reaction mixture in toluene was collected and returned to the three-neck round bottom flask.

Hexamethyldisilazane (66.0 g) was added to the stirring reaction mixture in toluene through the addition funnel. The mixture was heated at reflux with stirring for a period of time of about three hours, after which the mixture was allowed to cool to room temperature and then filtered. The filtrate was then distilled to remove the toluene-water azeotrope to yield a solution of the MQ resin, whose solids content was determined to be about 50–60%.

B. Sodium Silicate Method

MQ may also be prepared by the reaction of trimethylchlorosilane, methacryloxypropyltrimethoxysilane and sodium silicate. As described here a MQ resin with an M/Q ratio of about 0.6 and a (meth)acrylate content of about 4 mole % may be prepared. Of course, as with the tetraethoxy silane method, variations of the M/Q ratio and (meth)acrylate content may be achieved through routine variations in the amount of starting material.

A 16.5% hydrochloric acid solution was prepared by mixing 51.03 g of concentrated hydrochloric acid (37%) and 63.41 g of de-ionized water. The acid was then charged into a one-liter three-neck round bottom flask equipped with condenser, mechanical stirrer and addition funnel. The following solutions were then sequentially added to the hydrochloric acid over a period of time of about 5 minutes, with vigorous stirring: (1) aqueous sodium silicate solution prepared by mixing 128.57 g of a 28% silica-containing sodium silicate ($SiO_2/Na_2O$=3.22; 0.60 mole $SiO_2$) with 183.67 g deionized water; (2) isopropyl alcohol (122.92 g); and (3) a solution of trimethylchlorosilane (39.06 g; 0.36 mole) and methacryloxypropyltrimethoxysilane (9.92 g; 0.04 mole) in toluene (10 g).

After the addition was complete, the mixture was heated to reflux for a period of time of about 3 hours, after which time toluene (150 g) was added. The mixture was allowed to cool to room temperature and phase separated in a separatory funnel. About 190 g of the top layer was collected and placed in a 500 ml, three-neck round bottom flask equipped with a reflux condenser, a mechanical stirrer and an additional funnel.

Hexamethyldisilazane (38 g) was added to the stirring reaction mixture to the solution through the addition funnel. The mixture was heated at reflux for a period of time of about 3 hours and was then allowed to cool to room temperature. The mixture was then filtered, and the solids content determined to be 28%.

2. Synthesis of UV and UV/Moisture Curable Silicones

A. UV Curable Silicones

For instance, to prepare the silicone designated as "A" in Table 1, three hundred (300) grams (96% by weight of the reactants) of the silanol terminated polydimethylsiloxane fluid (having a viscosity of 750 cps and a molecular weight of 12,000) was placed in a one-liter three-neck round bottom flask and mixed with 12.6 g (4% by weight of the reactants) of acryloxymethyldimethylacryloxysilane at room temperature. The mixture was heated under vacuum to remove the acrylic acid by-product formed.

B. UV/Moisture Curable Silicones

For instance, to prepare the silicone designated as "C" in Table 1, three hundred (300) grams (95.6% by weight of the reactants) of the silanol terminated polydimethylsiloxane fluid (having a molecular weight of 12,000) was placed in a one-liter three-neck round bottom flask. To the flask were further added 13.64 g (4.4% by weight of the reactants) of methacryloxypropyltrimethoxysilane and 0.25 ml (negligible amount) of 1.6M n-butyl lithium in hexane. The mixture was stirred at room temperature for 30 minutes with nitrogen sparge to obtain a clear fluid. Several pieces of dry ice were then added to the mixture to quench the lithium catalyst.

3. General Preparation of Resin-reinforced UV and UV/Moisture Curable Silicones To prepare a resin-reinforced UV curable silicone composition in accordance with the present invention, the solids content of the resin in a toluene solution was first determined as follows. An aluminum dish filled with one gram of the silicone resin/toluene solution was heated at a temperature within the range of about 100 to about 150C. Such heating causes the toluene to evaporate leaving a solid at a constant weight. For a 50% filled composition, the weight of the solution containing 25 g of the resin was then mixed with 25 g of a UV curable silicone fluid (for instance, an acryloxymethyl-terminated polydimethylsiloxane, as described in U.S. Pat. No. 5,179,134) or a UV/moisture dual cure silicone fluid (for instance, a methacryloxypropyldimethoxysilyl-terminated polydimethylsiloxane, as described in U.S. Pat. No. 5,663,269). Of course, different levels of filling may also be achieved by varying the amount of resin and polydimethylsiloxane chosen.

The mixed polymer-resin solution was subjected to rotary vacuum stripping to remove the toluene solvent for a time sufficient to reach a weight of about 50 g. To the stripped mixture was further added diethoxyacetophenone ("DEAP", as a photoinitiator) in an amount of 1.5% by weight. In the event that a moisture cure mechanism is also desired, a moisture cure catalyst, such as tetraisopropyltitanium in an amount of 0.5% by weight, should be added.

Examples of UV and UV/moisture silicone compositions, certain of which being filled with silicone resins for comparative purposes, are given below in Table 1.

TABLE 1

| Sample No. | Resin | M/Q Ratio | MA % | UV Silicone | Resin: Siloxane Ratio |
|---|---|---|---|---|---|
| 1 | — | — | — | A | — |
| 2 | — | — | — | B | — |
| 3 | — | — | — | C | — |
| 4 | M4Q6 | 0.667 | 0 | A | 1:1 |
| 5 | M4Q6 | 0.667 | 0 | B | 1:1 |
| 6 | M fluid | | | A | 1.1 |
| 7 | M fluid | | | B | 1:1 |

*The following conventions are used for resin structures: M for $Me_3SiO_{1/2}$; T for $MeSiO_{3/2}$; T' or $T^{Ma}$ for $CH_2=C(Me)COOCH_2CH_2CH_2SiO_{3/2}$; and Q for $SiO_{4/2}$.

Silicone A is a linear acrylate-terminated polydimethylsiloxane prepared by condensation of a hydroxyl-terminated polydimethylsiloxane having a weight average molecular weight of 12,000 with acryloxymethyldimethylacryloxysilane. This silicone is used as Sample No. 1. Silicone B is an acrylate-terminated polydimethylsiloxane silicone prepared as above, though from a hydroxyl-terminated polydimethylsiloxane having a weight average molecular weight of 28,000. This silicone is used as Sample No. 2. Silicone C is a methacryloxypropyldimethoxy-terminated polydimethylsiloxane having a weight average molecular weight of 20,000. This silicone is used as Sample No. 3.

Sample Nos. 4 and 5 were prepared by mixing silicone A and B with a non-functional MQ resin. Sample Nos. 6 and 7 were prepared by mixing silicone A and B with a trimethyl-terminated polydimethylsiloxane (having a viscosity of 100 cps).

4. Cure of UV Curable MQ-Reinforced Silicones

The samples as described in Table 1 were cured into 75 mil films by exposure for one minute on each side to UV light emitted from a medium pressure mercury lamp with an intensity of 70 $mW/cm_2$ (at 365 nm). Where moisture cure was also desirable, the cured films were allowed to stand at ambient conditions for additional time (such as at least about three to about seven days) before physical properties of cured films were determined.

5. Physical Properties of Unfilled and Inert Additive Filled, UV Silicones

In order to establish comparative data, physical properties of cured silicone compositions with and without an inert additive were determined, including tensile strength, modulus at 50% elongation and elongation at rupture of test pieces, previously cut from cured slabs of the compositions.

Table 2 below shows that the unfilled UV silicones—Sample Nos. 1, 2 and 3—when cured demonstrated poor physical properties. The tensile strength and elongation of the cured silicone elastomers were low: between 37–53 psi and between 38–71%, respectively. Two inert additives—a silanol resin prepared by cohydrolyzing trimethylchlorosilane and tetraethoxysilane in a mole ratio of 4:6, and a trimethylsilyl-terminated polydimethylsiloxane with a viscosity of 100 cps—were also added at a 1:1 ratio to the acrylate-terminated polyoganosiloxanes A and B. These are Sample Nos. 4–5 and 6–7, respectively.

TABLE 2

| | Physical Properties | | |
|---|---|---|---|
| Sample No. | Tensile (psi) | Modulus (@ 50%) | Elongation (%) |
| 1 | 37 | — | 71 |
| 2 | 53 | — | 38 |
| 3 | 42 | — | 63 |
| 4 | 25 | 10 | 103 |
| 5 | 60 | 7 | 206 |
| 6 | 17 | 13 | 68 |
| 7 | 88 | 10 | 230 |

From a comparison of the data presented in Table 2, it may be seen that the silicone elastomers with inert additives demostrated weak tensile properties, thereby showing very little reinforcement and modulus. The higher elongation of elastomers with additives can be attributed to the plasticizing effect of the additives.

6. Reinforcement of UV Curable Silicones With Various Ratios of Different Resins Four silicone resins were prepared for evaluation with various levels of M, T and Q, with the "T" unit representing methacryloxyalkyltrifunctional silyl. These resins may be designated as: $M_{42}T^{MA}_{3}Q_{55}$ (1), $M_{40.8}T^{MA}_{5.8}Q_{53.4}$ (2), $M_{45}T^{MA}_{5}Q_{50}$ (3) and $M_{44}T^{MA}_{8}Q_{48}$ (4), where the numerical subscript represents the mole % of M, T and Q starting material used during resin preparation, as described in Section 1 above. These resins were mixed together with Silicone B to prepare, the compositions to be evaluated.

Resins 1 and 2 had a M/Q ratio of 0.764; Resin 3 had a M/Q ratio of 0.9; and Resin 4 had a M/Q ratio of 0.917.

Resin 2 had a (meth)acrylate content of twice that of Rein 1, and Resin 4 had a (meth)acrylate content 1.6 times that of Resin 3. These resins were each mixed with Silicone B in ratios ranging from 1:2 to 2:1, as described in Section 3 above. The M/Q ratios, (meth)acrylate content and resin/siloxane ratios are given in Table 3a below.

TABLE 3a

| Sample No. | Resin | M/Q Ratio | MA % | Resin: Siloxane Ratio |
|---|---|---|---|---|
| 8 | 1 | 0.76 | 3 | 1:2 |
| 9 | 1 | 0.76 | 3 | 1:1 |
| 10 | 1 | 0.76 | 3 | 2:1 |
| 11 | 2 | 0.76 | 5.8 | 1:2 |
| 12 | 2 | 0.76 | 5.8 | 1:1 |
| 13 | 2 | 0.76 | 5.8 | 2:1 |
| 14 | 3 | 0.9 | 5 | 1:2 |
| 15 | 3 | 0.9 | 5 | 1:1 |
| 16 | 3 | 0.9 | 5 | 2:1 |
| 17 | 4 | 0.9 | 8 | 1:2 |
| 18 | 4 | 0.9 | 8 | 1:1 |
| 19 | 4 | 0.9 | 8 | 2:1 |

The resin-reinforced compositions were cured by the method described in Section 4 above. The physical properties on the cured silicone elastomers are given below in Table 3b.

TABLE 3b

| | Physical Properties | | | |
|---|---|---|---|---|
| Sample No. | Tensile (psi) | Modulus (@ 50%) | Modulus (@ 100%) | Elongation (%) |
| 8 | 183 | 23 | 37 | 250 |
| 9 | 235 | 32 | 55 | 212 |
| 10 | 428 | 65 | 100 | 232 |
| 11 | 331 | 85 | 197 | 142 |
| 12 | 622 | 316 | — | 88 |
| 13 | 602 | 386 | — | 80 |
| 14 | 188 | 38 | 72 | 164 |
| 15 | 418 | 77 | 202 | 164 |
| 16 | 493 | 178 | 424 | 114 |
| 17 | 359 | 143 | 330 | 107 |
| 18 | 452 | 290 | — | 79 |
| 19 | 466 | — | — | 28 |

Within each resin-reinforced silicone composition, higher levels of resin produced a cured silicone elastomer with higher tensile strength and higher modulus values. In addition, lower elongation values were observed to be present in the cured elastomers when higher levels of resin were used.

7. Reinforcement of UV Curable Silicone Compositions With Siloxanes of Different Molecular Weights Three silicone resins (1, 3 and 4) were mixed with poliorganosiloxanes A, B and C at different ratios to achieve different levels of resin filler in the silicone compositions. These compositions and the relative components are shown below in Table 4a.

TABLE 4a

| Sample No. | Resin | M/Q Ratio | MA % | UV Silicone | Resin: Siloxane Ratio | Cure Mode |
|---|---|---|---|---|---|---|
| 20 | 1 | 0.764 | 3 | A | 1:1 | UV |
| 21 | 1 | 0.764 | 3 | C | 1:1 | UV |
| 22 | 1 | 0.764 | 3 | C | 1:1 | dual |
| 23 | 1 | 0.764 | 3 | B | 1:1 | UV |
| 24 | 3 | 0.9 | 5 | A | 2:1 | UV |
| 25 | 3 | 0.9 | 5 | A | 1:1 | UV |

TABLE 4a-continued

| Sample No. | Resin | M/Q Ratio | MA % | UV Silicone | Resin: Siloxane Ratio | Cure Mode |
|---|---|---|---|---|---|---|
| 26 | 3 | 0.9 | 5 | A | 1:2 | UV |
| 27 | 3 | 0.9 | 5 | B | 2:1 | UV |
| 28 | 3 | 0.9 | 5 | B | 1:1 | UV |
| 29 | 3 | 0.9 | 5 | B | 1:2 | UV |
| 30 | 4 | 0.9 | 8 | A | 1:1 | UV |
| 31 | 4 | 0.9 | 8 | C | 1:1 | UV |
| 32 | 4 | 0.9 | 8 | C | 1:1 | dual |
| 33 | 4 | 0.9 | 8 | B | 1:1 | UV |

For Silicone C, UV cure (with photoinitiator added but no moisture curing catalyst present) as well as UV/moisture dual cure conditions (both photoinitiator and moisture curing catalyst present; UV cure followed by at least 2 days additional moisture cure) were used to cure the siloxane into an elastometer.

These resin-filled silicone compositions were prepared and cured, as described in Sections 2 and 3 above. The physical properties of the cured elastomers are shown below in Table 4a.

TABLE 4b

| Sample No. | Tensile (psi) | Modulus (@ 50%) | Modulus (@ 100%) | Elongation % |
|---|---|---|---|---|
| 20 | 221 | 55 | 161 | 110 |
| 21 | 218 | 37 | 79 | 140 |
| 22 | 432 | 62 | 121 | 180 |
| 23 | 235 | 32 | 55 | 212 |
| 24 | 464 | 209 | — | 79 |
| 25 | 282 | 92 | — | 93 |
| 26 | 62 | 51 | — | 55 |
| 27 | 493 | 178 | 424 | 114 |
| 28 | 418 | 77 | 202 | 164 |
| 29 | 188 | 38 | 72 | 164 |
| 30 | 321 | — | — | 34 |
| 31 | 656 | 480 | — | 60 |
| 32 | 803 | 677 | — | 59 |
| 33 | 452 | 290 | — | 79 |

The three silicone resins evaluated in the UV curable silicone compositions showed that elongation of the cured elastomer increases as does the molecular weight of the siloxane. Modulus of the cured elastomers on the other hand appears to decrease with an increase of the molecular weight of the siloxane. Comparison of silicone compositions (Sample Nos. 25–30) prepared from Silicones B and C with Resin 3 [M/Q=0.9; 5% (meth)acrylate] shows that the overall strength of the cured elastomer appears to be a function of the resin:siloxane ratios. Comparing Sample Nos. 21 and 22 with Sample Nos. 31 and 32, it may be seen that UV cure followed by moisture cure imparts improved tensile strengths as well as increased modulus to the cured elastomers.

8. Silicone Reinforcement With Various Resins

Various silicone resins were prepared and mixed with an acrylate-terminated polydimethylsiloxane having a number average molecular weight of about 28,000 to evaluate the degree of reinforcement provided to the cured elastomer. To simplify the evaluation, the compositions were prepared at resin/polymer mixtures of 1:1 ratios. The tensile strengths, moduli at 50%, and elongation of the cured elastomer were determined and given as tensile (psi)/modulus at 50% (psi)/elongation below in Table 5.

TABLE 5

| M/Q Ratio | MA Content (%) tensile (psi)/modulus @ 50% (psi)/elongation (%) | | | | | |
|---|---|---|---|---|---|---|
| | 3 | 3.3 | 4 | 5 | 5.8 | 8 | 10 |
| 0.616 | — | — | 182 | — | — | — | — |
| | | | 164 | | | | |
| | | | 64 | | | | |
| 0.703 | — | 396 | — | — | — | — | — |
| | | 220 | | | | | |
| | | 98 | | | | | |
| 0.764 | 235 | — | — | — | 622 | — | — |
| | 32 | | | | 316 | | |
| | 212 | | | | 88 | | |
| 0.9 | — | — | — | 535 | — | 452 | — |
| | | | | 128 | | 290 | |
| | | | | 168 | | 79 | |
| 1.205 | 4 | — | — | — | — | — | — |
| | 1 | | | | | | |
| | 179 | | | | | | |
| 1.25 | — | — | — | — | — | — | 388 |
| | | | | | | | 261 |
| | | | | | | | 86 |

M/Q ratio gives a relative measure of the molecular weight of the resin. A resin with a low M/Q ratio tends to be of higher molecular weight (and therefore more viscous), and a resin with high M/Q ratios tend to be of low molecular weight (and therefore less viscous). Resins with high M/Q ratios tend to be more compatible with UV silicones and possess lower viscosities.

On the other hand, the number of polymerizable groups on the resin itself is determined by its total methacrylate content as well as its M/Q ratio. Thus, for two resins with the same methacrylate content, the resin having a lower M/Q ratio will have a higher number of methacrylate per resin molecule due to the total methacrylate groups being evenly distributed to fewer molecules. This is due to higher molecular weight associated with a lower M/Q ratio. As a consequence, resins having low M/Q ratios but high methacrylate contents may offer better reinforcement.

In Table 5, it is seen that the resin with high M/Q (1.205) and low methacrylate content (3%) did not confer reinforcement to the cured elastomer. This is due to the low methacrylate content on the resin. Increasing methacrylate (say up to 10%) in a resin with a still higher M/Q ratio (say 1.25) leads to reinforcement as shown in Table 5. However, with such a high methacrylate content, the cured elastomer exhibited a milky white appearance indicating separate resin and siloxane domains.

Although resins with wide ranges of M/Q ratios and (meth)acrylate contents were found to reinforce UV and/or UV/moisture curable silicone compositions, particularly desirable combinations offering excellent reinforcement and dispensability have MQ ratios within the range of about 0.7 to 0.9, and (meth)acrylate contents within the range of about 4–8%.

9. Moisture Curable Resin Reinforced Moisture Curable Silicones

A moisture curable resin reinforced silicone formulation was prepared by mixing 352 g of a MQOH-1 resin (50% solid in xylene with 1% silanol, available from PCR, Gainesville, Fla.) with 250 g of a silanol-terminated polydimethylsiloxane with a molecular weight of 12,000. To this mixture was further added 50.74 g of vinyltrimethoxysilane. One ml of a 1.6M n-butyllithium was then added and the mixture was heated to distill away the methanol that was formed from capping of the vinyltrimethoxysilane to the silanol. After distillation of the methanol, the mixture was further vacuum stripped to remove the xylene solvent to yield a 450 g of a clear liquid.

The liquid was catalyzed by the addition of 0.5% by weight of dibutyltindilaurate. The formulation was then allowed to cure under ambient conditions for 4 days (Sample No. 34) and 7 (Sample No. 35) days. The physical properties of the cured elastomers are shown below in Table 6.

TABLE 6

| Sample No. | Tensile (psi) | Modulus (@ 50%) | Modulus (@ 100%) | Modulus (@ 200%) | Elongation (%) |
|---|---|---|---|---|---|
| 34 | 228 | 43 | 56 | 86 | 393 |
| 35 | 283 | 57 | 74 | 117 | 349 |

A typical unfilled room temperature vulcanizing formulation would exhibit physical properties with less than 100 psi tensile and less than 100% elongation under these conditions, much like the physical properties shown by unfilled Sample Nos. 1–3.

10. Moisture Curable Resin Reinforced UV/Moisture Curable Silicones

A resin with moisture cure capability was prepared by reacting 500 g of MQOH-1 (commercially available from PCR; 50% solids in xylene) with 60 g of vinyltrimethoxysilane using 1 ml of a 1.6M n-butyllithium. The mixture was distilled at a temperature of about 60° C. to remove approximately 60 g of methanol. The solids content of the resulting resin was determined by heating 1.00 g thereof in an aluminum dish on a hot plate until constant weight was reached. It was found to be 60%.

To a 250 g of the resin was added 135 g of a methacryloxypropyldimethoxysilyl-capped polydimethylsiloxane with a molecular weight of 12,000. The mixture was further heated under vacuum to remove the xylene solvent to yield 285 g of a clear liquid. Diethoxyacetophenone (2.85 g) and tetraisopropyltitanate (1.43 g) were further added to the mixture.

The catalyzed mixture was exposed to UV radiation to form cured silicone elastomers. The physical properties of the initially UV cured elastomer (Sample No. 36) as well as elastomers cured by exposure to UV radiation, followed by exposure to atmospheric moisture for 3 days (Sample No. 37), 7 days (Sample No. 38) and 10 days (Sample No. 39) were determined and are shown below in Table 7.

TABLE 7

| Sample No. | Tensile (psi) | Modulus (@ 50%) | Modulus (@ 100%) | Modulus (@ 200%) | Elongation (%) |
|---|---|---|---|---|---|
| 36 | 76 | 25 | 40 | 70 | 216 |
| 37 | 317 | 117 | 183 | — | 180 |
| 38 | 441 | 136 | 215 | 425 | 207 |
| 39 | 468 | 149 | 237 | — | 198 |

These results indicate that the initially UV cured silicone elastomer was weak, and lacked reinforcement, while UV cured silicone elastomers subsequently moisture cured through both the resin and the UV crosslinked polydimethysiloxane rendered the silicone elastomers reinforced with high tensile strengths and high moduli.

11. UV/Moisture Curable Resin Reinforced UV/Moisture Curable Silicones

A UV/moisture curable resin was prepared by reacting 150 g of MQOH-1 with 26.26 g of methacryloxypropyltrimethoxysilane in the presence of 0.3 ml of a 1.6M n-butyllithium. Methanol thus formed from the reaction was distilled away from the mixture. The solids content of the capped resin was found to be 52%.

Fifty grams of this capped resin solution was mixed with 26 g of a methacryloxypropyldimethoxysilyl-terminated polydimethylsiloxane with a molecular weight of 12,000. The resin-polymer mixture in solution was further catalyzed with 0.5 g of diethoxyacetophenone and 0.25 g of tetraisopropyltitanate. A UV cured sample was observed to be fragile and therefore its physical properties was not obtained. However, Sample No. 40 was moisture cured with simultaneous solvent evaporation for 7 days, and Sample No. 41 was UV cured followed by further moisture cure and simultaneous solvent evaporation for 7 days.

The process was repeated with a higher molecular weight UV/moisture curable silicone. Thus, 50 g of the capped resin solution was mixed with 26 g of a methacryloxypropyldimethoxysilyl-terminated polydimethylsilopxane with a molecular weight of 20,000. The resin-polymer mixture in solution was also catalyzed with 0.51 of diethoxyacetophenone and 0.25 g of tetraisopropyltitanate. A UV cured sample of this mixture was also observed to be fragile and therefore its physical properties were not obtained. Sample No. 42 was UV cured followed by 7 days of further moisture cure with solvent evaporation, and resulted in a strong silicone elastomer. The physical properties of Sample Nos. 40–42 are shown below in Table 8.

TABLE 8

| Sample No. | Mode of Cure | Tensile (psi) | Modulus (@ 50%) | Modulus (@ 100%) | Modulus (@ 200%) | Elongation (%) |
|---|---|---|---|---|---|---|
| 40 | Moisture | 302 | 60 | 89 | 148 | 392 |
| 41 | UV/moisture | 425 | 379 | — | — | 56 |
| 42 | UV/moisture | 500 | 273 | — | — | 85 |

These results indicate that moisture cure only of the system leads to the formation of a reinforced rubber with high elongation whereas UV/moisture dual cure results in the formation of strong elastomers with tighter crosslinking than moisture cure alone. Compare these results with Sample No. 3, reinforcement due to moisture cure and UV/moisture cure were evident.

A UV curable silicone may be formulated with a UV/moisture curable resin to yield an elastomer cured by both UV and moisture, having beneficial properties.

Though these examples have been provided for illustrative purposes, the true measure of the spirit and scope of the invention is as set forth in the claims.

It is claimed:

1. A resin-reinforced silicone composition curable by exposure to radiation in the electromagnetic spectrum, exposure to moisture and combinations thereof, comprising:
   (a) a polyorganosiloxane with reactive groups selected from the group consisting of photocurable groups, moisture curable groups, and combinations thereof;
   (b) a silicone resin selected from
      (i) those formed from at least one silane within the formula $R^1_m R^2_p Si(X)_{4-(m+p)}$ I, where $R^1$ is a (meth) acrylate functional group or a hydrolyzable group, and $R^2$ may be the same or different and may be selected from the group consisting of monovalent ethylenically unsaturated radicals, hydrogen, $C_{1-12}$ alkyl, $C_{6-12}$ aryl, $C_{7-18}$ alkylaryl, and hydrolyzable groups, X is a hydrolyzable group, m is an integer from 1 to 3, and m+p is an integer from 1 to 3;

(ii) those formed from at least one silane within the formula $R^3{}_qSi(X)_{4-q}$ II, where $R^3$ may be the same as or different from $R^2$ above and may be selected from monovalent ethylenically unsaturated radicals, hydrogen, $C_{1-12}$ alkyl, $C_{6-12}$ aryl, $C_{7-18}$ alkylaryl, and q is an integer from 1 to 3, reacted with at least another silane within the formula of $R^4{}_rR^5{}_sSi(X)_{4-(r+s)}$ III, where $R^4$ and $R^5$ may be the same or different and may be selected from monovalent ethylenically unsaturated radicals, hydrogen, $C_{1-12}$ alkyl, $C_{6-12}$ aryl, $C_{7-18}$ alkylaryl, r is an integer from 1 to 3, and r+s is an integer from 1 to 3, provided the silicone resin formed contains at least some hydrolyzable group, X; and combinations thereof; and (c) a cure catalyst selected from the group consisting of a photoinitiator component; a moisture curing catalyst, and combination thereof.

2. The composition of claim 1, wherein the silicone resin is formed as a reaction product of the at least one silane within the formula $R^1{}_mR^2{}_pSi(X)_{4-(m+p)}$ I, and at least one other silane within the formula, $R_nSi(X)_{4-n}$ IV, wherein R may be the same or different and selected from the group consisting of hydrogen, $C_{1-2}$ alkyl, $C_{6-12}$ aryl, $C_{7-18}$ arylalkyl, $C_{7-18}$ alkylaryl, haloalkyl, and haloaryl, X is a hydrolyzable functionality, and n is an integer from 0 to 3.

3. The composition of claim 1, wherein the photocurable group is selected from the group consisting of acrylate, methacrylate and glycidoxyl groups.

4. The composition of claim 3, wherein the acrylate group is acryloxypropyl and the methacrylate group is methacryloxypropyl.

5. The composition of claim 1, wherein the polyorganosiloxane is within the formula:

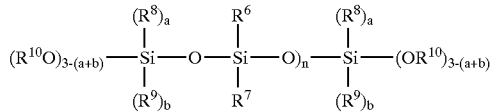

wherein $R^6$, $R^7$, $R^8$ and $R^9$ may be the same or different and are alkyl, alkenyl, aryl, and (meth)acryl, provided that at least one of $R^6$, $R^7$, $R^8$ or $R^9$ is (meth)acryl, having up to 10 carbon atoms ($C_{1-10}$), or substituted versions thereof; $R^{10}$ is alkyl having up to 10 carbon atoms; n is an integer between about 150 and 1,200; a is 1 or 2; b is 0, 1 or 2; and a+b is 1, 2 or 3.

6. The composition of claim 1, wherein the moisture curable group is an alkoxy group.

7. The composition of claim 1, wherein the photoinitiator component is selected from the group consisting of substituted or unsubstituted benzoin, benzophenone, dialkoxybenzophenones, Michler's ketone, diethoxyacetophenone and combinations thereof.

8. The composition of claim 6, wherein the photoinitiator component is diethoxyacetophenone.

9. The composition of claim 1, wherein the moisture curing catalyst is selected from the group consisting of organic titanium derivatives, organic tin derivatives and combinations thereof.

10. The composition of claim 1, wherein the photocurable group is reactive when exposed to elevated temperature conditions.

11. The composition of claim 1, further comprising a reactive diluent component.

12. The composition of claim 11, wherein the reactive diluent is a member selected from the group consisting of vinyl-terminated polydimethlylsiloxane, vinylterminated silicone resin, and combinations thereof.

13. The composition of claim 2, wherein the at least one first silane is present in an amount within the range of from about 1 to about 10 mole % and the at least one other silane is present in an amount within the range of from about 90 to about 99 mole %, of the total of the silanes.

14. The composition of claim 1, wherein the polyorganosiloxane is present in an amount within the range of from about 15 to about 85 mole % of the total composition.

15. The composition of claim 1, wherein the photoinitiator component is present in an amount within the range of from about 0.1 to about 5 mole % of the total composition.

16. The composition of claim 1, wherein the moisture curing catalyst is present in an amount within the range of from about 0.1 to about 5 mole % of the total composition.

17. Irradiated reaction products of the composition of claims 1.

18. Moisture cure reaction products of the composition of claim 1.

19. The reaction products of claim 17, further cured by moisture.

20. The reaction products of claim 17, further cured by heat.

21. A method of curing a silicone composition to form an elastomer, the steps of which comprise:

a. applying a silicone composition of claim 1 to a substrate; and b. irradiating the substrate with UV irradiation sufficient to substantially cure the composition.

22. A method of curing a silicone composition to form an elastomer, the steps of which comprise:

a. applying a silicone composition of claim 1 to a substrate; and b. exposing the composition to moisture sufficient to substantially cure the composition.

23. A method of curing a UV/moisture dual curing silicone composition to form an elastomer, the steps of which comprise:

a. applying a silicone composition of claim 1 to a substrate having shadow areas not readily accessible to ultraviolet or visible radiation in an amount sufficient to coat the ultraviolet and visible radiation-accessible and the shadow areas;

b. irradiating the substrate with UV irradiation sufficient to substantially cure the composition in the ultraviolet and visible radiation-accessible area; and c. exposing the composition on the substrate to moisture for a time sufficient to cure the composition in the shadow areas.

24. The reaction products of claim 18, further cured by heat.

25. The reaction product of claim 19, further cured by heat.

* * * * *